United States Patent [19]
Strindehag et al.

[11] 3,968,833
[45] July 13, 1976

[54] METHOD FOR HEAT RECOVERY IN VENTILATION INSTALLATIONS

[75] Inventors: Ove Strindehag; Roy Holmberg, both of Jonkoping, Sweden

[73] Assignee: Aktiebolaget Svenska Flaktfabriken, Nacka, Sweden

[22] Filed: Mar. 18, 1975

[21] Appl. No.: 559,500

[30] Foreign Application Priority Data

Mar. 26, 1974 Sweden.........................7404016

[52] U.S. Cl. .................................... 165/66; 62/82; 165/17; 165/59; 165/107; 237/80
[51] Int. Cl.² ......................................... A23C 3/02
[58] Field of Search ................. 165/107, 2, 59, 104, 165/106, 4, 66, DIG. 12, 17; 34/86; 237/80; 62/81, 82, 160

[56] References Cited
UNITED STATES PATENTS

| | | | |
|---|---|---|---|
| 2,691,488 | 10/1954 | Ghai ..................................... | 165/66 |
| 2,825,210 | 3/1958 | Carr ...................................... | 165/66 |
| 3,194,308 | 7/1965 | Haried ................................. | 165/107 |
| 3,623,549 | 11/1971 | Smith .................................... | 165/66 |

*Primary Examiner*—Charles J. Myhre
*Assistant Examiner*—Daniel J. O'Connor
*Attorney, Agent, or Firm*—Dorfman, Herrell and Skillman

[57] ABSTRACT

A method of operating recuperative heat exchange means in the supply and exhaust ducts of a ventilation installation exposed to sub-freezing atmospheric condition so that the heat exchanger in the exhaust duct is allowed to ice up and is periodically defrosted. The method operates to control the temperature in the spent-air heat exchanger in various ways, including raising the input temperature of the the exchange medium to reduce the cooling effect on the spent air, or by reducing the flow of heat exchange medium to achieve the same result.

11 Claims, 5 Drawing Figures

METHOD FOR HEAT RECOVERY IN VENTILATION INSTALLATIONS

This invention relates to a method for increasing the efficiency of heat recovery in heat recovering in heat recovering systems in ventilation installations, which comprise one or more heat exchangers, for example laminated batteries, disposed in the supply air and, respectively, spent air duct of the installation, a pipe circuit interconnecting the heat exchangers, and a pump circulating a heat carrier in liquid state through the pipe circuit and heat exchangers for heat transfer from the spent air to the supply air.

Recuperative heat exchangers connected with liquid have increasingly been utilized in the recent years for the recovery of heat in ventilation installations. These heat recovery units, in their most usual design, comprise two laminated batteries, which are interconnected on the liquid side, and a pump for circulating the liquid between the two laminated batteries. Heat exchange between the spent air flow of the ventilation system, i.e. the heated air flow, and the cold supply air flow takes place thereby that one laminated battery is mounted in the spent air duct and the other battery is mounted in the supply air duct. The laminated batteries usually are assembled of copper pipe coils and of flanges or fins in the form of aluminium discs attached to the coils. As heat exchange medium, usually a liquid mixture of water and glycol is used.

Heat recovery units of the kind described above have the advantage a.o. that the supply air and spent air ducts can be arranged at a long distance from each other, and that practically all leakage of air from supply air ducts over to spent air ducts, and vice versa, is eliminated. A difficulty in conjunction with the heat recovery unit in question is the ice formation developing on the laminated battery in the spent air duct when the outside temperature is substantially below freezing.

The ice formation on the laminated battery in the spent air duct is due to the fact that the spent air usually is moist. Therefore, when the air is being cooled, condensation water deposits on the pipe and disc or fin surfaces and freezes to ice when the temperature of these surfaces is below 0°C. The outside air temperature at which the ice formation in the spent air duct develops, depends, of course, on the thermal efficiency degree of the unit and on the temperature and relative humidity of the spent air. Typical values for the thermal efficiency degree of the heat recovery unit in question usually lie between 50% and 70%, and the relative humidity of the spent air often amounts to 20–50%. This implies that risk of ice formation usually exists at outside temperatures between −5°C and −15°C, when the temperature of the spent air is +22°C, i.e. normal room temperature.

The most usual way of preventing ice formation on the laminated battery in the spent air duct is to lower the thermal efficiency degree of the unit at low outside temperature, for example by reducing the flow quantity or by reducing the heat exchange surfaces. Another way of preventing ice formation is to preheat the outside air prior to its passage through the heat recovery unit. In both cases the thermal effect, which the unit can transfer, is restricted.

The invention has as its object to overcome the aforesaid problems by the method defined in the attached claims. The transferable effect is hereby substantially increased, compared with conventional units.

The invention is described in the following, with reference to the accompanying drawings.

Figure 1:
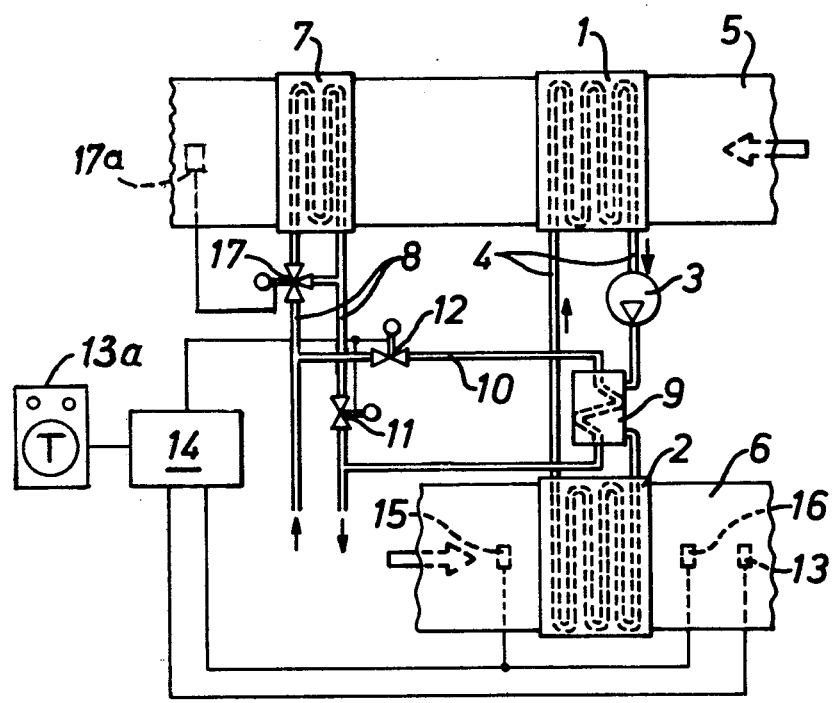
FIG. 1 shows in a schematic way the structure of a heat recovery unit in a ventilation system, in which additional heat is supplied to the heat carrier or heat exchange medium by means of a dual flow heat exchanger.

The heat recovery unit will be described in greater detail in the following, with reference to FIGS. 1 and 1a, in a case when heat is supplied to the circulating heat carrier from the post-heating circuit. The heat recovery unit comprises a laminated battery 1 (or another similar air/liquid heat exchanger), a laminated battery 2 and a circulation pump 3, by means of which the heat exchange medium is circulated, preferably in counter-flow, in the pipe circuit 4. The laminated battery 1 is disposed in the supply air duct 5, and the laminated battery 2 in the spent air duct 6. For being able to heat the outside air to the desired temperature, usually also a post-heating battery 7 is disposed in the supply air duct 5. Through this battery circulates via the piping 8 water with a temperature of about 80°C from a conventional heat source (not shown), for example, an oil-fired boiler. The heat recovery unit heretofore described can be said to operate in conventional manner. As appears from FIG. 1, a liquid/liquid dual flow heat exchanger 9 has been connected to said unit which communicates via the pipe circuit 10 with the pipe circuit 8. By closing temporarily the valve 11 and simultaneously opening the valve 12, heat can be supplied to the heat exchange medium circulating through the laminated batteries 1 and 2. (If there is sufficiently high pressure drop in the pipe circuit 10, the valve 12 can be omitted, and the liquid flow to the heat exchanger 9 can be controlled merely by opening and closing the valve 11). It is, of course, also thinkable to place the liquid/liquid heat exchanger 9 in the pipe circuit 4 in a different way than shown in FIG. 1.

When heat is being supplied to the heat exchange medium circulating through the laminated batteries 1 and 2, the disc or fin temperature of these batteries rises and, consequently, ice formation possibly developed on the battery 2 melts. The entire heat recovery unit, thereby, can operate with a mean efficiency degree at outside temperatures which is substantially higher than it is otherwise possible. In other words, the transferable thermal effect can be increased at low outside temperatures, because the air in the spent air duct can be cooled to lower minus degrees, compared with the cooling limit at about +4°C at conventional operation, due to the risk of ice formation on the spent air battery.

Figure 1A:
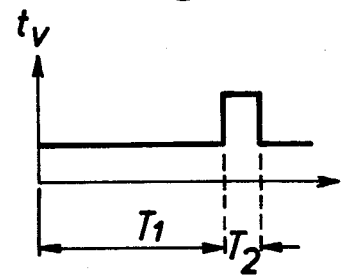
FIG. 1a is a chart showing the temperature of the heat exchange medium as a function of the time, in accordance with the method of the present invention.

As heat is supplied intermittently to the heat exchange medium in the circuit 4, the time progress for the liquid temperature, $t_v$, at the inlet to the battery 2, can be indicated as in FIG. 1a. During the time $T_1$ water vapor condensates from the spent air on the battery and freezes to ice. At the same time, the temperature of the outgoing air is reduced considerably. During the time $T_2$ heat is supplied, as described above, to the heat carrier in the circuit 4 whereby the ice amount developed melts. The thermal energy recovered from the spent air during the time $T_1$ is to a great extent due to the cooling of the air and condensation of the water vapor and only to a small degree to the ice formation heat. The thermal energy to be supplied for melting the ice, consequently, is substantially smaller than the extra energy recovered during the time $T_1$ due to the strong cooling. The time $T_2$ can generally be considerably shorter than $T_1$, but the heat recovery unit may also be dimensioned so that defrosting is required only during night hours. In order to be able to permit heavy ice formation, preferably a distance between the discs on the spent air battery is to be chosen which is greater than usual.

Depending on whether defrosting takes place only during night hours (or during another period when heat need not be recovered) or whether it takes place in a more frequent manner, for example once an hour, somewhat different control means possibly must be chosen for controlling the valves 11 and 12. When the defrosting takes place during night hours, the control can be carried out by means of a thermostat 13 and/or a timer control 13a and a central control unit 14, which at low temperatures of the outgoing air starts the defrosting at a predetermined time. When short icing and defrosting periods are desired, the length of the defrosting periods may be controlled by the pressure transmitters 15 and 16, which also are connected to the central control unit 14. Defrosting is started when the pressure drop over the laminated battery 2 has increased to a predetermined value, and is interrupted when the pressure drop has decreased to the normal value. Irrespective of whether defrosting takes place with short or long intervals, or with a combination of the two control methods, the energy recoverable at low outside temperatures is substantially higher than with the recovery unit operating without defrosting device, because the temperature of the spent air scarcely can be decreased lower than to +4°C. In the case described, however, the temperature of the spent air often can be decreased to 5–10 degrees below zero or lower.

It is to be observed that, when heat is supplied to the heat exchange medium in the pipe circuit 4, the heat supply to the post-heating battery 7 must be decreased. This usually does not imply any complication, because this heat supply yet is controlled by the valve 17 and a thermostat 17a disposed in the supply air duct. It is further to be observed that in certain cases, the post-heating battery 7 may be omitted, viz. in those cases when this battery must deliver only a small heat addition compared with that obtained from the heat recovery unit. This additional heat can then be supplied thereby that a smaller amount of liquid is allowed to flow continuously through the pipe circuit 10, although there need not be risk per se of ice formation on the laminated battery. Also at very low outside temperatures, heat can be supplied to the heat exchange medium in the pipe circuit 4 only for the reason of preventing the liquid medium from freezing to ice.

Figure 2:
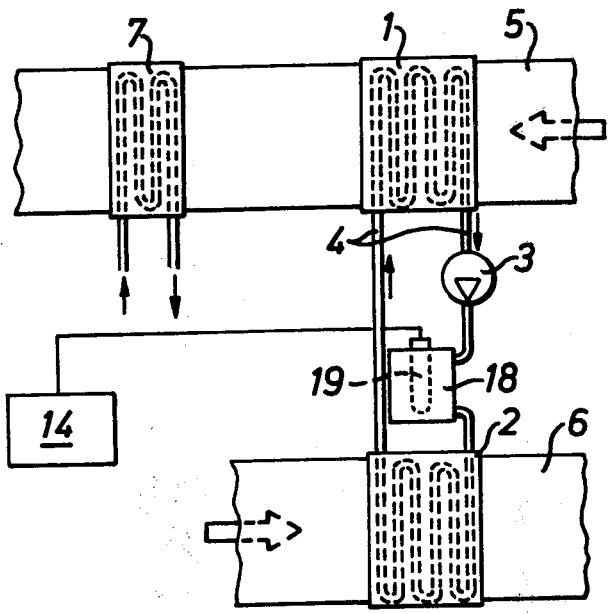
FIG. 2 shows in a schematic way a heat recovery unit, in which additional heat is supplied to the heat exchange medium by means of an electric heating device.

An alternative method of supplying heat to the heat exchange medium in the pipe circuit 4 is shown in FIG. 2. In the container 18, which may be filled with, for example, a mixture of water and glycol, an electric immersion heater 19 has been installed which can be switched on and off by control signals from the central control unit 14. In this way, heat can be supplied intermittently to the liquid in the pipe circuit 4. The defrosting can be started as shown previously in FIG. 1, when the pressure drop over the laminated battery 2 due to the ice formation has increased over a certain value, and is stopped when the pressure drop again is normal. The central control unit 14 is then controlled by pressure transmitters in the spent air channel 2. When defrosting is desired during periods of a day during which the installation is not in use, for example during night hours, the central control unit 14 can be controlled by a timer and a thermostat disposed in the spent air duct 2. It should also be observed that the temperature of the supply air can be increased by some degree, and that, therefore, in certain cases the post-heating battery 7 can be omitted when a certain electric effect continuously is supplied to the immersion heater 19 at low outside temperatures. For being able to cope with such kind of operation, the immersion heater preferably should have several levels of output, so that it may, in response to changes in the supply air temperature, maintain the temperature of the heat exchange medium above its freezing point but below the frost point of the spent air during time $T_1$ and at a higher temperature during time $T_2$.

Figure 3:
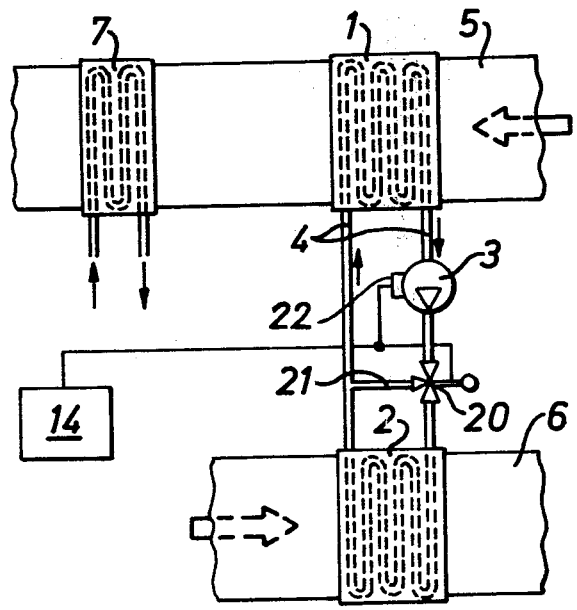
FIG. 3 shows in a schematic way a heat recovery unit where the liquid flow through the spent air heat exchanger is decreased by shunting and/or by controlling the pump.
Figure 3A:
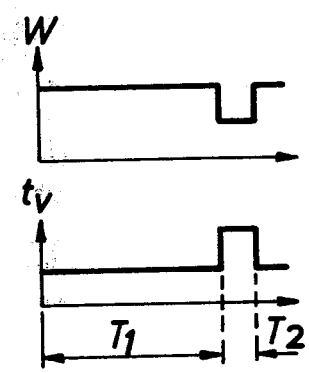
FIG. 3a is a chart showing the flow and temperature progress as a function of the time.

A still further method of intermittently increasing the temperature of the heat exchange medium circulating through the laminated battery 2 is shown in FIG. 3. A three-way valve 20 in the pipe circuit 4 controls via the shunt conduit 21 the liquid flow passing through the laminated battery 2. The liquid flow, W, through the laminated battery 2 can be reduced intermittently by the control signal from the central control unit 14, as can be seen in FIG. 3a, and thereby the temperature $t_v$ of the liquid at the inlet to the battery temporarily be increased. Defrosting, thus, can be effected during the time $T_2$. It is also thinkable to temporarily reduce the effective liquid flow in the pipe circuit by starting and stopping the pump with short intervals, for example by connections to the pump controls as indicated at 22. This implies that the three-way valve can be omitted, but this in turn requires a more complicated control device. The defrosting can take place, as stated above, when the pressure drop over the laminated battery 2 due to ice formation has increased over a certain value, or the defrosting may take place during some period of the day when the installation is not in use. Contrary to the two other defrosting methods discussed above, no additional heat is supplied to the heat exchange medium in the pipe circuit 4, so that in the case of defrosting taking place during the operation time of the ventilation system, an additional heat supply from the post-heating battery 7 is required for preventing the temperature of the supply air from decreasing.

The gains in energy which can be achieved by intermittent heating of the circulating heat exchange medium become apparent from the following example. The spent air is assumed to have a temperature of +22°C, and the outside air of −20°C. When the heat recovery unit is utilized in conventional manner, i.e. without intermitten heating of the circulating liquid for defrosting the laminated battery in the spent air duct, the temperature of the spent air generally cannot be decreased below +4°C, in view of the ice formation risk. The thermal efficiency degree, $\eta_t$, then can be expressed:

$$\eta_t = \frac{22-4}{22+20} = \frac{18}{42} = 0.429$$

provided that the supply air and spent air amounts are of equal size and that no moisture precipitates on the laminated battery in the spent air duct. When the moisture content in the spent air is high, moisture precipitates on the battery and thereby brings about a certain increase in the thermal efficiency. At a relative humidity in the spent air of 40%, an increase in the efficiency degree from 0.43 to about 0.45 is obtained due to the moisture precipitation on the battery. The transferable thermal effect at conventional operation of the heat recovery unit is hereinafter expressed as $P_o$. In order to determine the transferable thermal effect from the spent air which can be achieved by intermittent defrosting, three different cases with varying moisture content in the spent air will be studied below, viz.

1. the spent air is so dry that no condensation takes place
2. condensation takes place at +4°C
3. condensation takes place in the middle of the temperature interval +4°C to +22°C, i.e. at +13°C.

It is further assumed that the spent air temperature can be decreased to −5°C during the ice developing period. This corresponds to a thermal efficiency degree $$\eta = \frac{22+5}{22+20} = 0.643$$

in the case when no moisture precipitation takes place.

The transferable effect at intermittent defrosting, $P_i$, is obtained in case 1 according to $$P_i = \frac{0.643}{0.429} P_o = 1.50 P_o$$

In this case, thus, a 50% higher thermal effect can be transferred by the heat recovery unit. When the moisture content of the spent air is so high that moisture precipitation commences at +4°C, $P_i = 1.55 P_o$ is found during the ice developing period. During the defrosting period, however, the effect transferred by the heat recovery unit from the spent air decreases, so that on the average an effect being about 45% higher than $P_o$ can be transferred during a complete working cycle, comprising an ice developing period and a defrosting period. The corresponding mean effect is about 45% higher than $P_o$ also in the case when the moisture precipitation commences at the temperature +13°C.

In a ventilation installation, the moisture content of the spent air often varies from one day to the other and, besides, the air humidity differs considerably between installations, which a.o. depends on the moisture production in the building and on whether special air humidifiers have been installed or not. When 30% relative humidity of the spent air is regarded a typical value, which closely corresponds to the mean value of the moisture contents in the cases 2 and 3 described above, it is found that the transferable thermal effect at an outside temperature of −20°C can be increased by 40–50% when intermittent defrosting takes place with short intervals. When the defrosting takes place during some period of the day when the ventilation installation is not in operation, the transferable thermal effect can increase additionally by an average of about 10%.

We claim:

1. A method of increasing the efficiency of heat recovery in heat recovery systems in ventilation installations, comprising at least two heat exchangers, one disposed in the supply air duct and the other disposed in the spent air duct of the installation, a pipe circuit for heat exchange medium interconnecting the heat exchangers and pump means circulating a heat exchange medium through the pipe circuit and the heat exchangers to transfer heat from the spent air to the supply air, characterized in that at low outside temperatures the system is caused to alternate between two modes of operation in such a manner, that during the first mode the temperature of the heat exchange medium passing through the spent air heat exchanger is permitted to decrease to a temperature below the freezing point at which ice is formed from the moisture in the spent air, and a second mode in which the temperature of said heat exchange medium passing through the spent air heat exchanger is controlled to maintain a temperature above the freezing point at which the ice is caused to melt, maintaining said first mode for one period to permit ice to develop, and maintaining said second mode for a second period to effect melting of the developed ice.

2. A method according to claim 1, characterized in that the temperature of the heat exchange medium flowing through the heat exchanger in the spent air duct during the second mode is controlled by supplying heat to the heat exchange medium from a separate heat source.

3. A method according to claim 2, characterized in that the heat is supplied to the heat exchange medium through a dual flow heat exchanger, the secondary circuit of which is coupled with the pipe circuit, and the primary circuit of which is connected to the separate heat source.

4. A method according to claim 3, wherein said installation includes a post-heating heat exchanger in the supply air duct downstream of said one heat exchanger, and a pipe circuit feeding heating medium to said post-heating heat exchanger, characterized in that the primary circuit of the dual flow heat exchanger is coupled with the pipe circuit to the post-heating heat exchanger whereby said dual flow heat exchanger and said post-heating heat exchanger use the same heat source.

5. A method according to claim 2, characterized in that the heat is supplied to the heat exchange medium by electrically heating the same.

6. A method according to claim 1, characterized in that the temperature of the heat exchange medium flowing through the heat exchanger in the spent air duct is controlled during the second mode reducing the flow of heat exchange medium through said heat exchanger.

7. A method according to claim 6, characterized in that the liquid flow through the heat exchanger is reduced by shunting.

8. A method according to claim 6, characterized in that the liquid flow through the heat exchanger is reduced by stopping the circulation pump means.

9. A method according to claim 1, characterized in that the second mode is caused to take place during a period in the operation of the ventilating system when the heat recovery demand is small.

10. A method according to claim 1, characterized in that the start and end of the second mode are controlled by sensing the pressure drop over the heat exchanger in the spent air duct, starting the mode when the pressure drop due to ice formation has increased to a predetermined value, and stopping the mode when the pressure drop has decreased to a predetermined value.

11. A method according to claim 1, characterized in that the temperature of the heat exchange medium is controlled by supplying heat to the heat exchange medium during both the first and second modes, the heat in the first mode maintaining the heat exchange medium above its freezing point, but below the freezing point of the air-borne moisture to permit ice development in the spent air exchanger; the heat in the second mode effecting melting of the developed ice.

* * * * *